(12) United States Patent
Jaksztat et al.

(10) Patent No.: US 7,473,389 B2
(45) Date of Patent: *Jan. 6, 2009

(54) METHOD AND DEVICE FOR BLOW-FORMING CONTAINERS

(75) Inventors: Wolf Jaksztat, Hamburg (DE); Michael Linke, Ahrensburg (DE); Rolf Baumgarte, Hamburg (DE); Michael Litzenberg, Geesthacht (DE); Klaus Vogel, Barsbüttel (DE); Günther Godau, Hamburg (DE)

(73) Assignee: SIG Technology Ltd., Neuhausen Rhine Falls (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/570,795

(22) PCT Filed: Aug. 30, 2004

(86) PCT No.: PCT/DE2004/001917

§ 371 (c)(1),
(2), (4) Date: Nov. 16, 2006

(87) PCT Pub. No.: WO2005/023517

PCT Pub. Date: Mar. 17, 2005

(65) Prior Publication Data

US 2007/0085246 A1 Apr. 19, 2007

(30) Foreign Application Priority Data

Sep. 5, 2003 (DE) .................................. 103 40 915
Apr. 8, 2004 (DE) ........................ 10 2004 018 146

(51) Int. Cl.
*B29C 49/12* (2006.01)

(52) U.S. Cl. .................... 264/529; 264/532; 425/529; 425/535

(58) Field of Classification Search ................. 264/529, 264/532; 425/529, 535
See application file for complete search history.

(56) References Cited

U.S. PATENT DOCUMENTS

| 5,182,122 | A | 1/1993 | Uehara et al. |
| 2007/0114703 | A1* | 5/2007 | Jaksztat et al. ............ 264/523 |

FOREIGN PATENT DOCUMENTS

| DE | 37 29 166 | 4/1988 |
| JP | 54 127 970 | 10/1979 |

OTHER PUBLICATIONS

Patent Abstracts of Japan, BD. 2000, No. 15, Apr. 6, 2001 & JP 2000 343 590 A (Toyo Seikan Kaisha LTD), Dec. 12, 2000.
Patent Abstracts of Japan, BD. 2000, No. 21, Aug. 3, 2001 & JP 2001 088 202 A (Hokkai Can Co LTD), Apr. 3, 2001.

* cited by examiner

*Primary Examiner*—Suzanne E. McDowell
(74) *Attorney, Agent, or Firm*—Friedrich Kueffner (57) ABSTRACT

The invention relates to a method and to a device which is used to blow-form containers (2). A preform (1) is stretched inside a blow form (4) by a horizontal bar (11) after thermal conditioning and is shaped in the container by means of blow pressure effects. At least one part of the pressurised gas is guided towards the base area of the container (2). One particular advantage of said invention is that the flow path ends in the vicinity of the base area. At least one part of the pressurised gas (2) is guided into the container by the horizontal bar (11).

33 Claims, 12 Drawing Sheets

METHOD AND DEVICE FOR BLOW-FORMING CONTAINERS

The invention concerns a method for blow molding containers, in which a preform is stretched inside a blow mold by a stretch rod after thermal conditioning and is reshaped into the container by the action of blowing pressure, and in which pressurized gas is fed into the container through the stretch rod.

The invention also concerns a device for blow molding containers, which has at least one blowing station with a blow mold and at least one stretch rod, and in which the stretch rod is connected to a supply system for supplying pressurized gas.

In container molding by the action of blowing pressure, preforms made of thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are gripping tongs for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms need to be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

DE-OS 101 45 579 gives a detailed description of a stretching system of a blowing station with an associated stretch rod. The stretch rod is designed here as a solid rod, and the blowing air is fed to the blow mold by a connecting piston that has a larger inside diameter than the outside diameter of the stretch rod. This produces an annular gap between the stretch rod and an inner surface of the connecting piston, through which the pressurized gas can flow.

The use of a hollow stretch rod is described, for example, in DE-OS 28 14 952. A connection for the pressurized gas is created in this case by an end of the tubularly shaped stretch rod that faces away from the stretch rod tip. Supplying pressurized gas through the end of a hollow stretch rod is also described in DE-OS 34 08 740 C2.

The previously known pressurized gas supply systems have not yet been able to meet all of the requirements that are being placed on them by continually increasing production rates. In accordance with the prior art, pressurized gas has been supplied until now in such a way that either the entire amount of pressurized gas required for the expansion of the preform is supplied through an annular gap that surrounds the stretch rod or, when hollow stretch rods are used, through the stretch rod and from a large number of outlets distributed along the stretch rod.

The objective of the present invention is to specify a method of the type described at the beginning, by which the process time for molding the containers is reduced.

In accordance with the invention, this objective is achieved by conveying at least a portion of the pressurized gas towards the base area of the container.

A further objective of the invention is to design a device of the aforementioned type in such a way that increased productivity can be achieved per blowing station used.

In accordance with the invention, this objective is achieved by virtue of the fact that the stretch rod has at least one flow path for the pressurized gas that leads into the region of a stretch rod tip.

By using the flow path for the pressurized gas used for blow molding the preform into the container that leads to the vicinity of the base area of the container, it is possible to achieve optimized process conditions with respect to the reshaping of the thermoplastic material. The compressed air flowing into the container not only causes expansion of the preform, but also cools the container material at the same time by virtue of the fact that the compressed gas flows past the material of the preform, the developing container bubble, and later the molded container base.

Cooling of the container material is desired in those regions where the preform has already at least approximately taken on the final shape of the container. However, cooling of the container material is undesirable in those regions in which relatively strong deformation of the material is still necessary. By using separate flow paths leading into the blow mold, it is possible to control the flow of pressurized gas into the container in such a way that the cooling of the container material achieved by the flow of pressurized gas into the container is optimized with respect to time, while at the same time a short filling time is achieved.

A locally precisely defined pressurized gas supply is also assisted by conveying the pressurized gas through the stretch rod.

Another variant for assisting the cooling effect consists in relieving the pressure at least partially through the stretch rod.

Optimization with respect to time of the start of the cooling effect to avoid premature cooling of the material can be achieved by conveying the pressurized gas towards the base area of the container at an internal pressure of the container of at least 10 bars.

A further delay of the cooling effect can be achieved by conveying the pressurized gas towards the base area of the container at an internal pressure of the container of at least 20 bars, and especially at an internal pressure of greater than 30 bars.

It is possible to avoid premature cooling and at the same time to initiate cooling in a timely fashion by conveying the pressurized gas towards the base area no later than 1 second after the start of the blowing operation.

In particular, it is proposed that the pressurized gas be conveyed towards the base area no later than 0.5 seconds after the start of the blowing operation.

In regard to the start of cooling, it was found to be especially advantageous to convey the pressurized gas towards the base area no later than 0.25 second after the start of the blowing operation.

A strong cooling effect is promoted by conveying at least 50% of the amount of gas flowing into the container towards the base area.

A further increase in the cooling effect is achieved by conveying at least 80% of the amount of gas flowing into the container towards the base area.

Purposeful conveyance of the compressed air flowing into the container towards the base area of the container can be achieved if the pressurized gas flows towards the base area starting from an upper part of the stretch rod that faces towards the base area.

In particular, it was found to be advantageous if the pressurized gas flows out of the stretch rod no more than 2.5 centimeters from a stretch rod tip.

A further increase in the cooling effect can be achieved if the pressurized gas flows out of the stretch rod no more than 1.0 centimeters from a stretch rod tip.

The cooling effect can be continued even after maximum filling of the container with compressed air has been reached if, no later than when a maximum pressure level within the container has been reached, gas is partially removed from the container without a significant reduction of the pressure level.

Alternatively or additionally to the use of different flow paths, it is also possible at least temporarily to vary the direction of flow of the gas flowing into the container.

Premature cooling of the base area of the container can be avoided by introducing the pressurized gas into the container some distance from the base area during a first phase of the process.

Process-engineering control of an optimum start of the cooling effect is assisted by conveying the pressurized gas towards the base area only during a second phase of the process.

Optimized material flow is achieved by removing the finished blow-molded container from the blow mold no later than 1.5 seconds after insertion of the preform into the blow mold.

Increased mechanical stability of the stretch rod by enlargement of the rod diameter can be achieved if at least two flow paths run through the stretch rod.

A typical embodiment consists in the fact that the flow path is designed for feeding pressurized gas for the container molding.

In particular, it is found to be advantageous for at least two flow paths to be designed for feeding pressurized gas with different pressure levels.

A wear-resistant connection of the interior of the stretch rod to the supply channels that have been provided can be accomplished if the stretch rod has an interior that is enclosed by sidewalls, and if the interior is connected to a pressurized gas supply by a plurality of recesses in the wall.

Controlled presetting of the given flow paths and flow times can be accomplished by arranging at least one adjusting element for realizing a valve function in the area of each flow path.

A cooling effect that can be varied with respect to time during the process sequence can be achieved if a slope of at least part of the flow path is variable relative to a longitudinal axis of the stretch rod.

Another measure for achieving a cooling effect that can be varied with respect to time consists in designing at least part of the flow path to be at least partially closable.

An optimum orientation of the flow of the pressurized gas is achieved if the flow path runs obliquely to the longitudinal axis of the stretch rod in the area of its discharge from the stretch rod.

In particular, it is proposed that an angle measured between the longitudinal axis of the stretch rod and a longitudinal axis of the flow path in the direction towards the container base has a value of 20-80°.

An especially strong cooling effect is achieved if a plurality of nozzle-like discharge ports for the pressurized gas is arranged in the area of the stretch rod tip.

Specific embodiments of the invention are schematically illustrated in the drawings.

Figure 1:
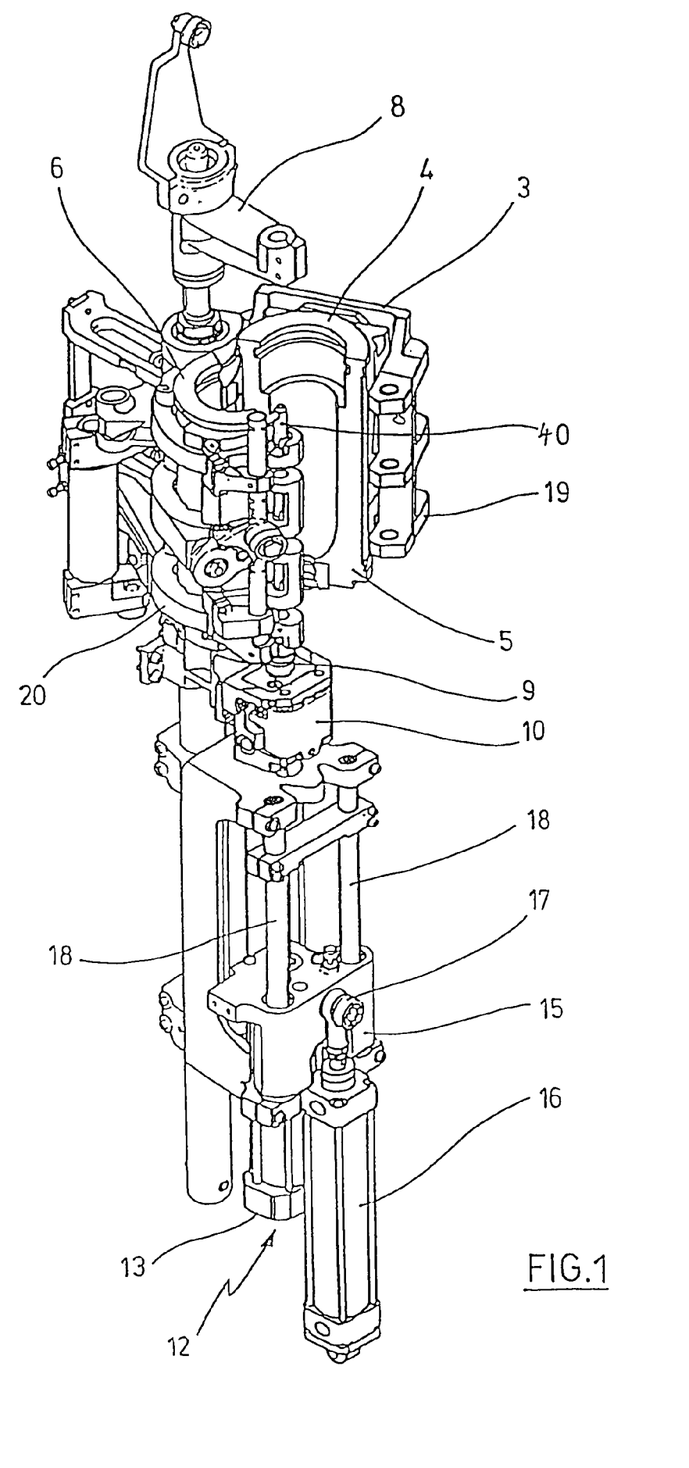
FIG. 1 shows a perspective view of a blowing station for producing containers from preforms.
Figure 2:
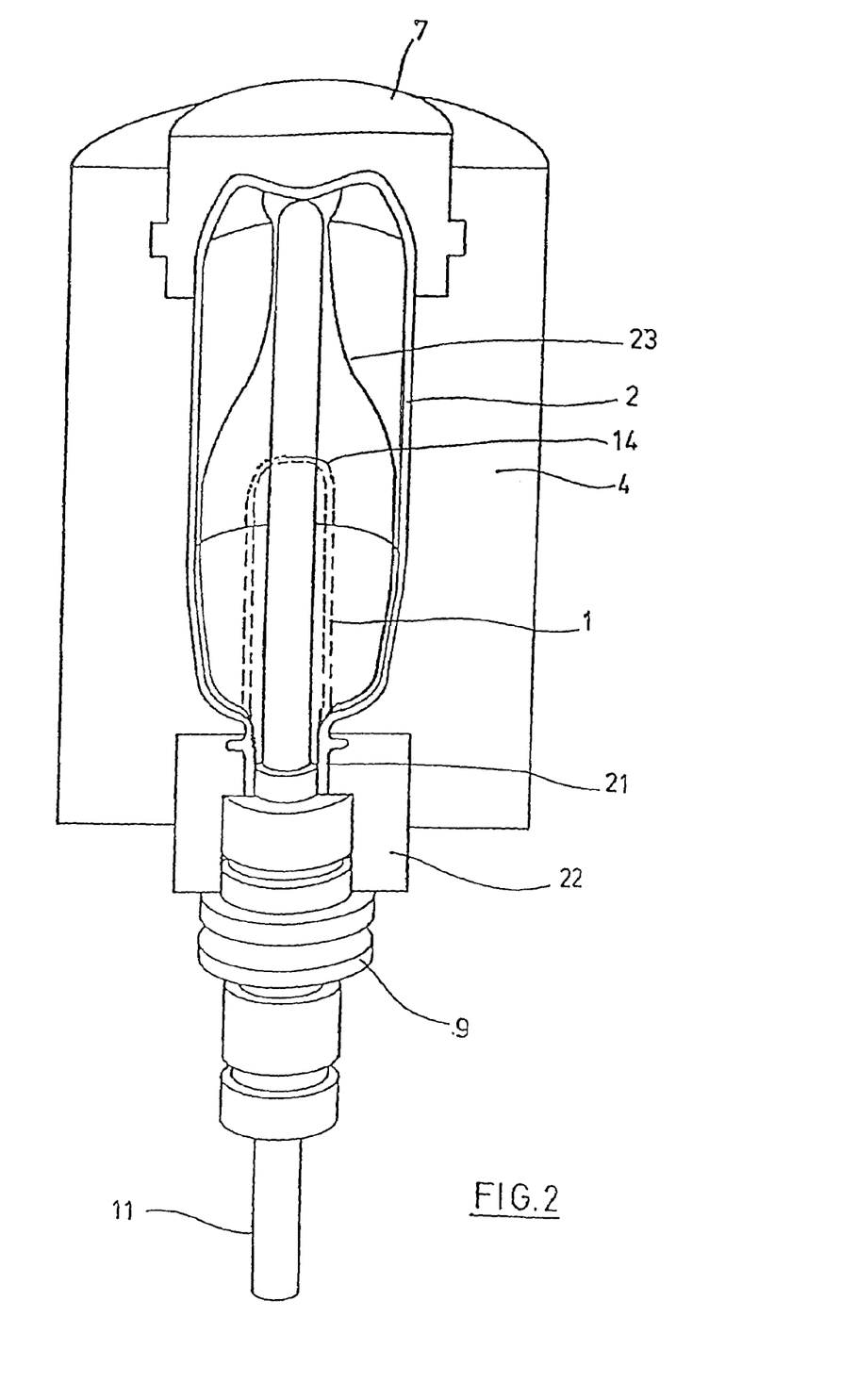
FIG. 2 shows a longitudinal section through a blow mold, in which a preform is stretched and expanded.

FIGS. 1 and 2 show the basic design of a device for reshaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a large number of treatment stations. However, it is also possible to insert the preform 1 directly into the blow mold 4 with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a curved track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
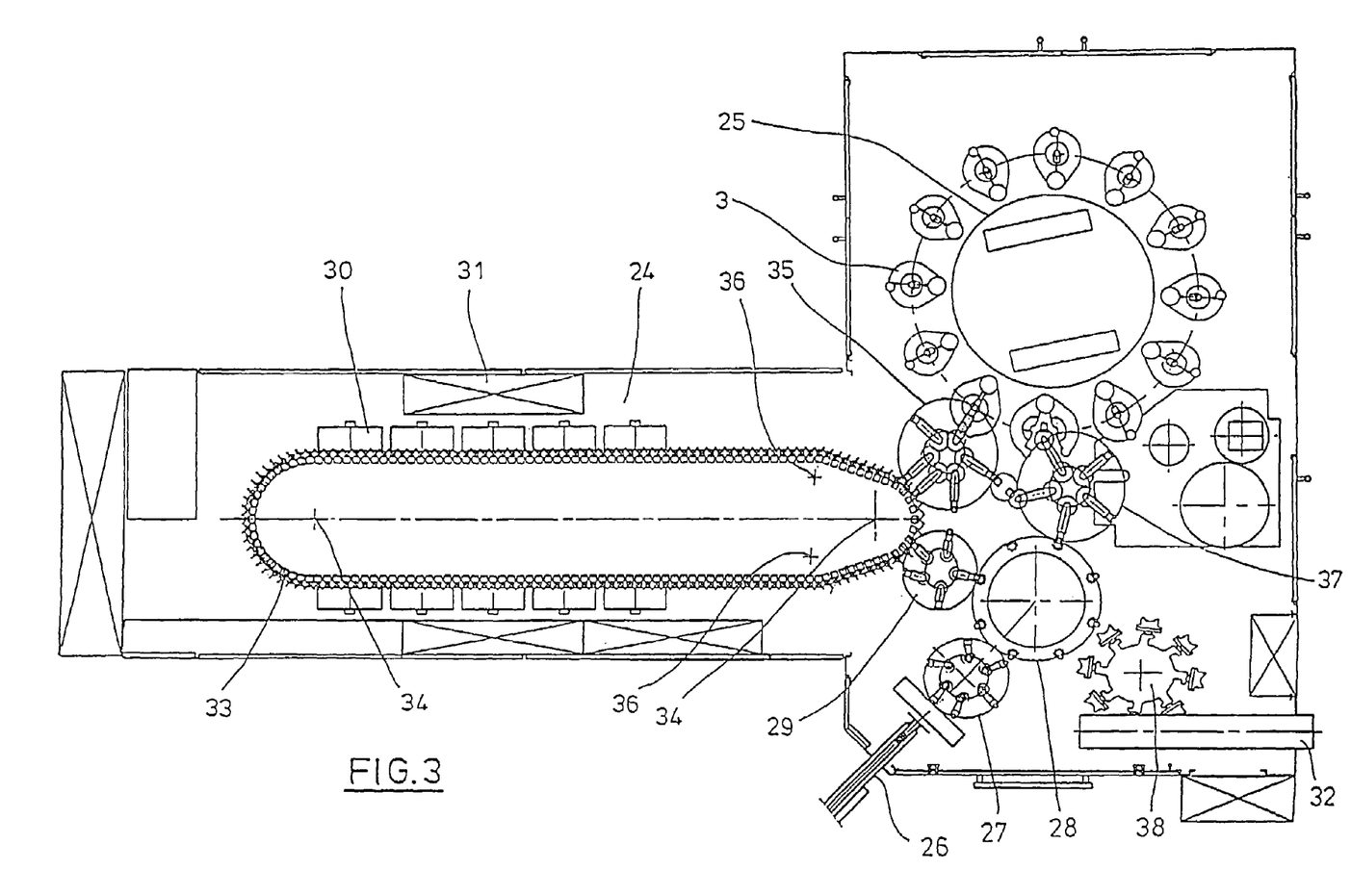
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be reshaped into a container 2 in such a way that the container 2 has material properties that ensure a long shelf life for the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10-25 bars is typically used, and during the main blowing phase, compressed air with a pressure in the range of 25-40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 facing the transfer wheel 29 and a feed wheel 35, and two relatively small-sized guide wheels 36 are used in the area of adjacent deflections. In principle, however, any other type of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
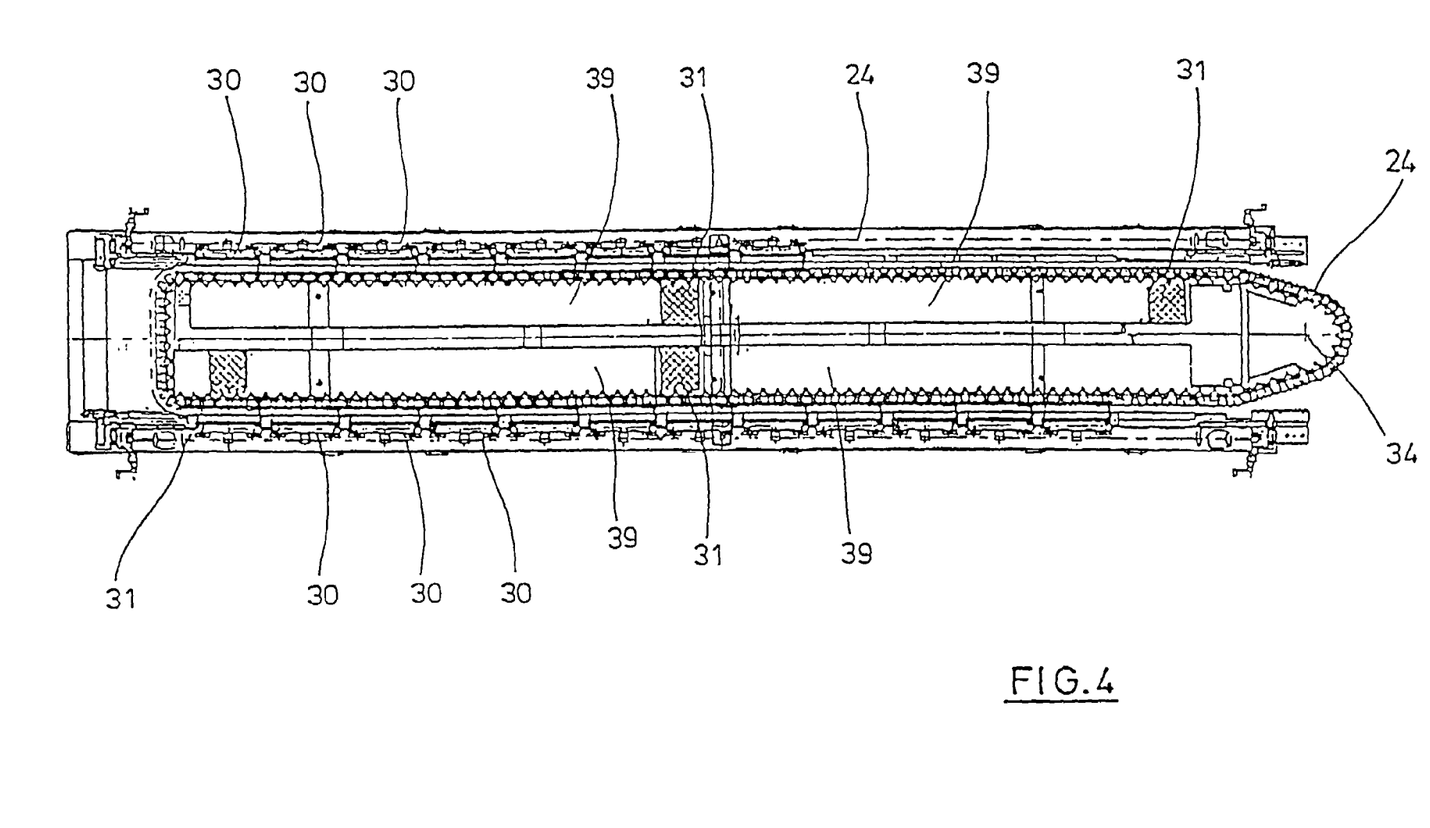
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
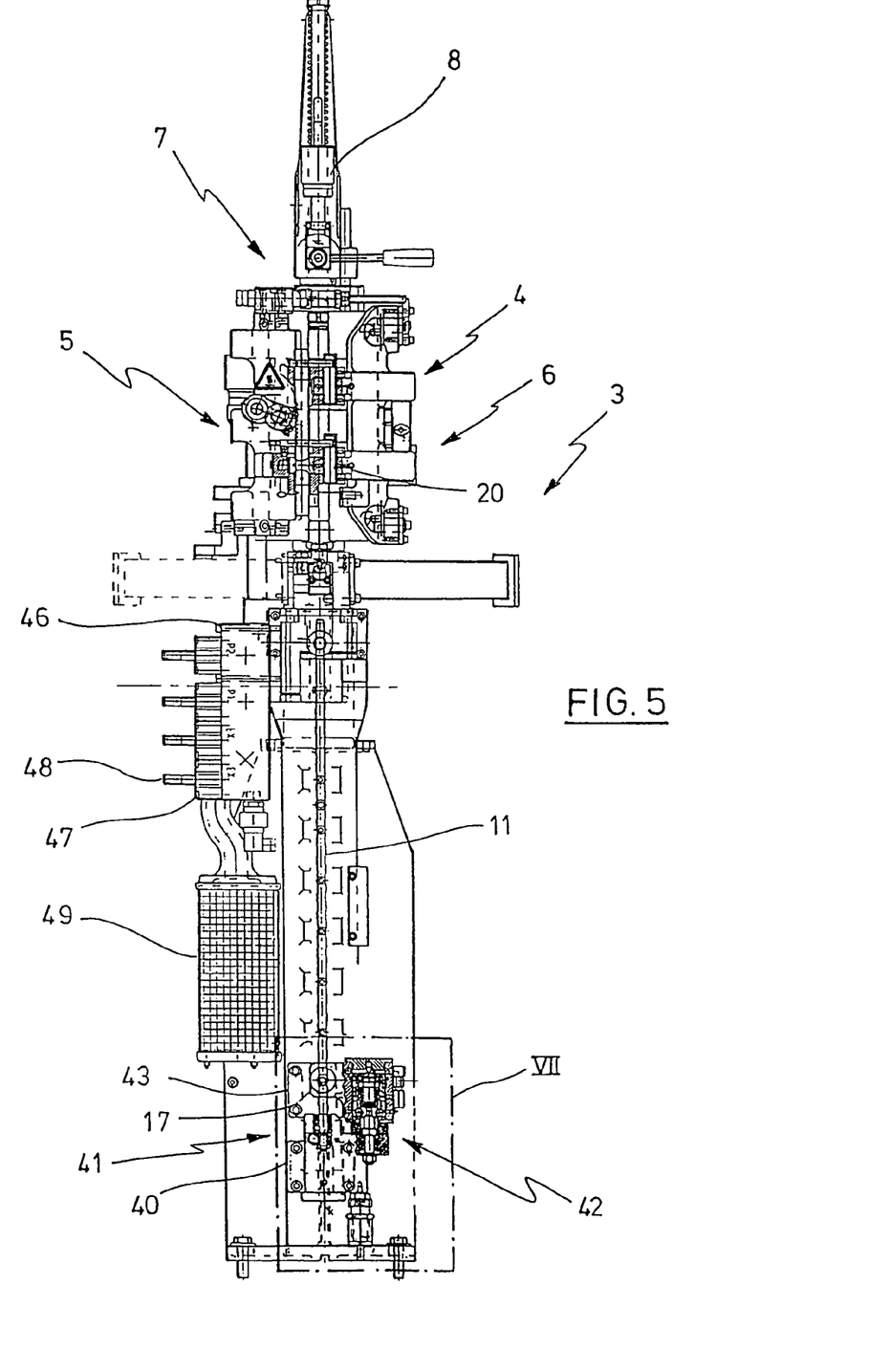
FIG. 5 shows a side view of a blowing station, in which a stretch rod is positioned by a stretch rod carrier.

FIG. 5 shows a view of the blowing station 3 that is modified relative to FIG. 1, as viewed from the front. In particular, this view shows that the stretch rod 11 is supported by a stretch rod carrier 41, which consists of a carrier base 41 and a roller carrier 43, which is connected with the carrier base 40 by a coupling element 42. The roller carrier 43 supports the guide roller 17, which serves to position the stretching system. The guide roller 17 moves along a curved track (not shown). Complete mechanical control of the stretching process is realized here.

The coupling element 42 illustrated in FIG. 5 can also be used in the embodiment of FIG. 1 to allow complete mechanical decoupling of the cylinders 12 from each other or from a supporting member for the guide roller 17.

FIG. 5 illustrates an engaged state of the coupling element 42, in which the carrier base 41 and the roller carrier 43 are connected with each other by the coupling element 42. This results in a rigid mechanical coupling, which causes positioning of the guide roller 17 to be directly and immediately converted to positioning of the stretch rod 11. As a result, precisely predetermined positioning of the stretch rod 11 is present in every state of motion of the blowing wheel 25, and with a large number of blowing stations 3 arranged on the blowing wheel 25, the positioning of the stretch rod 11 is precisely reproduced in each blowing station 3. This precise presetting of the positioning of the stretch rod 11 contributes to high product quality and high uniformity of the containers 2 that are produced.

FIG. 5 also shows the arrangement of a pneumatic block 46 for supplying blowing pressure to the blowing station 3. The pneumatic block 46 is equipped with high-pressure valves 47, which can be connected by connections 48 to one or more pressure supply sources. After the containers 2 have been blow molded, blowing air to be discharged to the environment is first fed to a muffler 49 via the pneumatic block 46.

Figure 6:
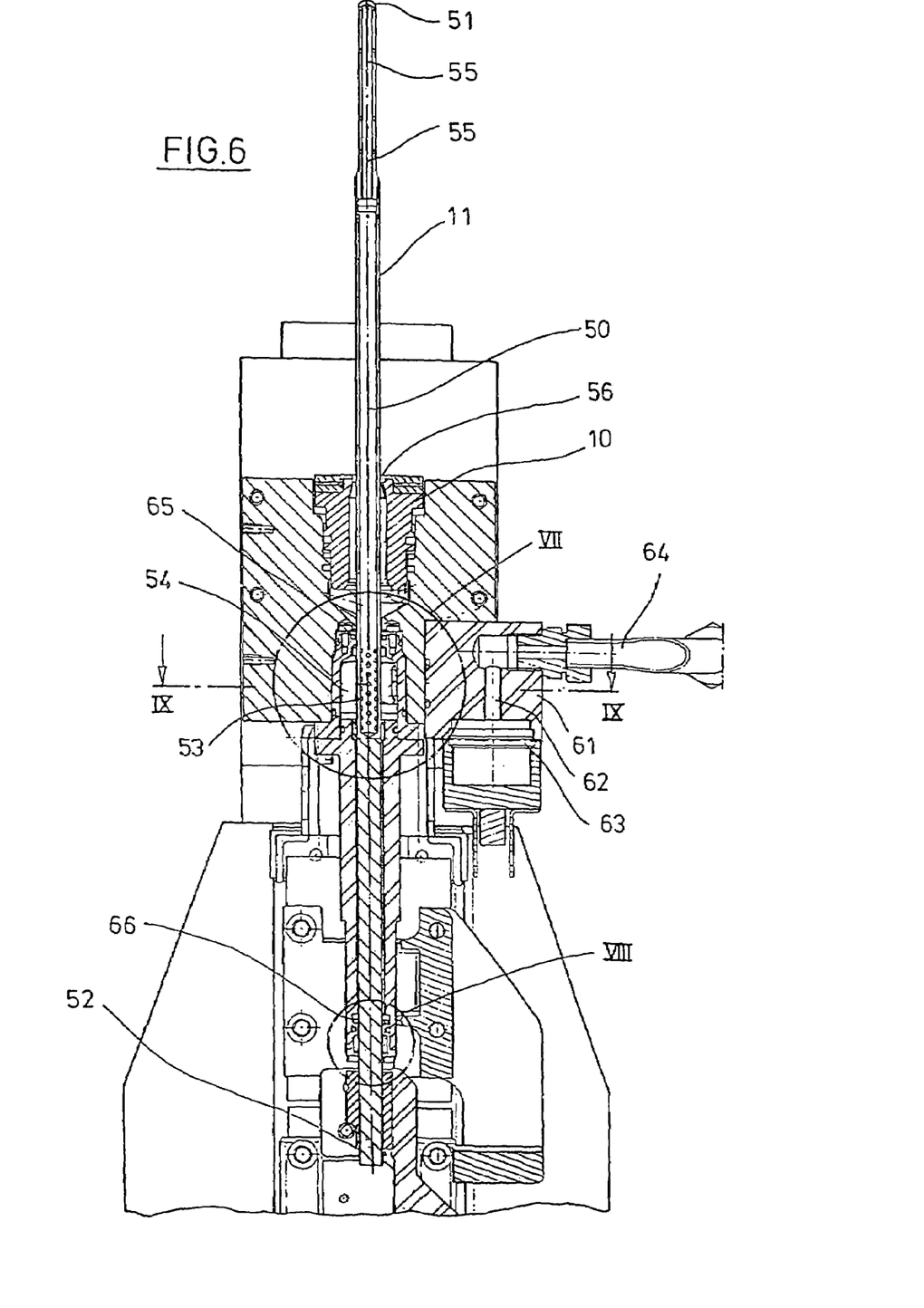
FIG. 6 shows an enlarged and partially cutaway view of an upper region of the stretch rod guide of the stretch rod.

FIG. 6 illustrates that the stretch rod 11 is provided with a rod interior 50, into which ports 53 open, which are positioned in between a stretch rod tip 51 and the opposite end 52 of the stretch rod 11 from the stretch rod tip 51. In the positioning of the stretch rod 10 illustrated in FIG. 6, the ports 53 constitute a connection between the rod interior 50 and a pressure chamber 54.

Discharge ports 55 are positioned in the region of the stretch rod 11 near the stretch rod tip 52. In the specific embodiment illustrated in FIG. 6, an annular gap 56 extends around the stretch rod 11 in the vicinity of the connecting piston 10, so that, in this embodiment, pressurized gas can be supplied both through the rod interior 50 and through the annular gap 56.

An admission channel, which connects a control valve 63 with a gas supply line 64, is located in the area of a valve block 61. The gas supply to the pressure chamber 54 is controlled by the control valve 63.

Rod seals 65, 66 seal the stretch rod 11 from the environment. Inside the pressure space bounded by the rod seals 65, 66, sealed guidance of the region of the stretch rod 11 that is provided with the ports 53 is possible.

Figure 7:
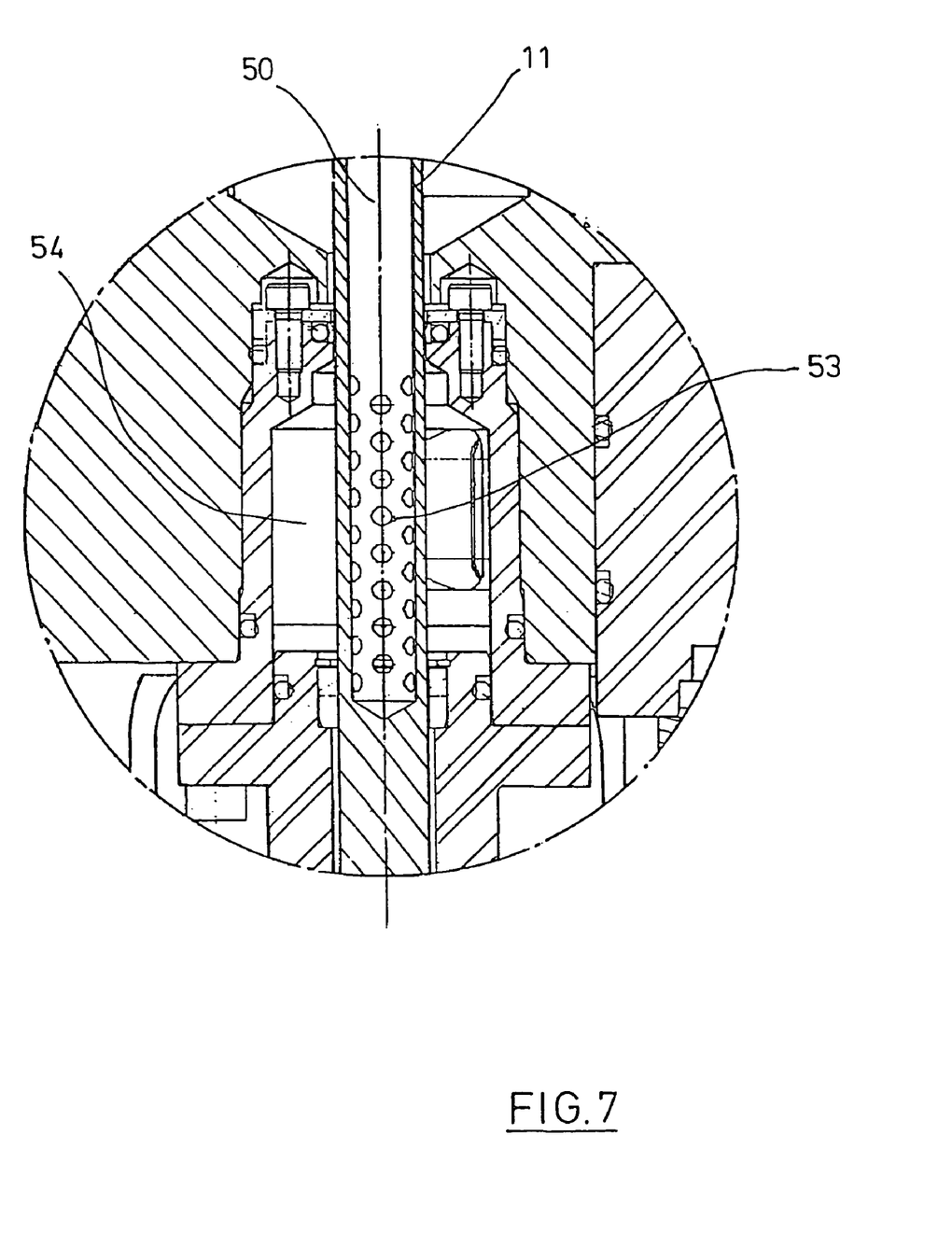
FIG. 7 shows an enlarged view of detail VII in FIG. 6.

FIG. 7 shows the structure of the stretch rod 11 in the region of the ports 53 and the design of the pressure chamber 54 in an enlarged view. In the illustrated embodiment, the ports 53 are arranged in rows in the direction of a longitudinal axis 57 of the stretch rod 11. Several rows of this type are spaced apart along the circumference of the stretch rod 11. In particular, it is proposed that the rows formed in this way in the direction of the longitudinal axis 57 be arranged with relative displacement from one another in such a way that the amount of the displacement is equal to half of the distance separating the ports 53 along the centerline that passes through them. In this way, each port 53 of a row of ports 53 is located at the center of a rectangular reference surface formed by two ports 53 in each of the two rows of ports on either side of the given port 53. This arrangement is conducive to uniform flow.

Figure 8:
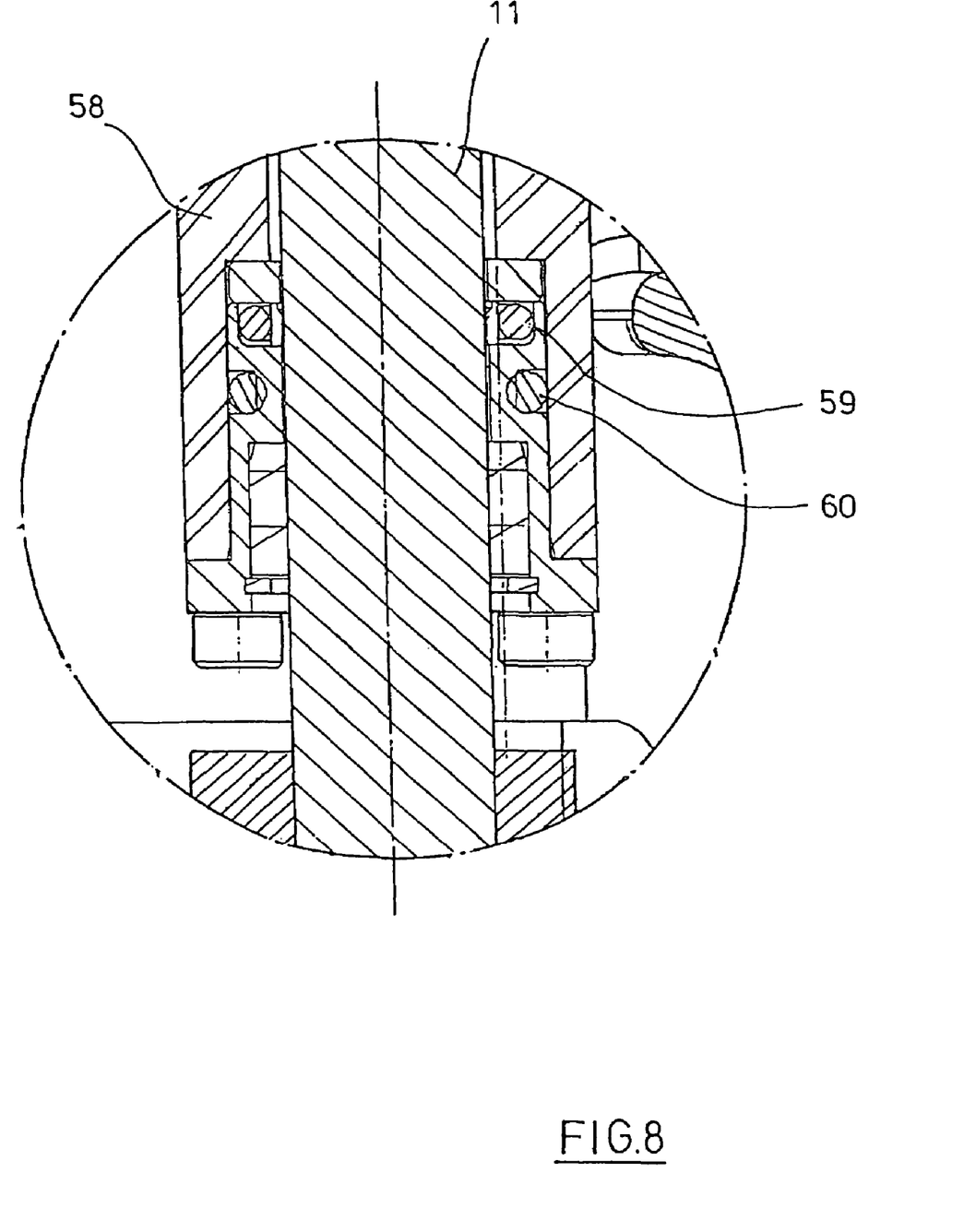
FIG. 8 shows an enlarged view of detail VIII in FIG. 6.

The enlarged view in FIG. 8 shows the sealed guidance of the stretch rod 11 in the region of a support 58. Seals 59, 60 are used for this purpose. The seal 59 can be designed as a rod seal, and the seal 60 can be designed as an O-ring. A rod seal consists of a hard ring, and an O-ring consists of soft metal.

FIG. 9 again illustrates the arrangement of the discharge ports 55 of the stretch rod 11 in a region of the stretch rod 11 near the stretch rod tip 51 and the arrangement of the annular gap 56 in the region of the mouth section 21 of the preform 1. This arrangement makes it possible, in particular, to introduce compressed air into the preform 1 or the developing container bubble 23 through the annular gap 56 at the beginning of the blow-molding operation and then to continue the introduction of the pressurized gas through the discharge ports 55 of the stretch rod 11. The discharge ports 55 are preferably arranged in a region of the stretch rod 11 close to the stretch rod tip 51, with the extent of this region in the direction of the longitudinal axis 57 being about 10 cm. A region of a maximum of 2.5 cm is preferred, and a region of a maximum of 1 cm is especially preferred.

Figure 9:
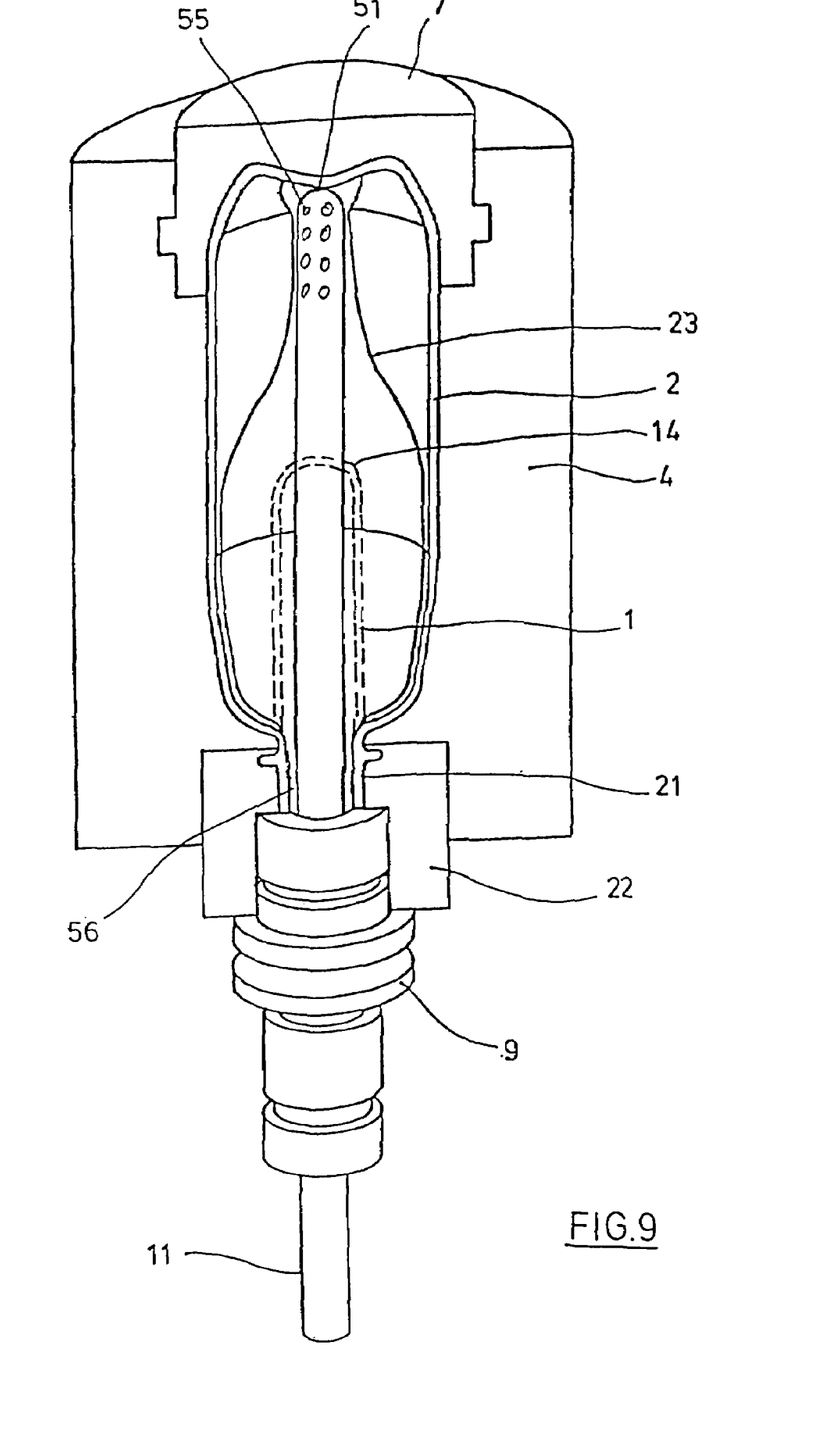
FIG. 9 shows a more detailed view, compared to FIG. 2, of a longitudinal section through the blowing station to illustrate two different flow paths for the pressurized gas.

FIG. 9 illustrates that, in a typical container bubble 23, the bubble already approaches or already rests against the blow mold 4 in the vicinity of the mouth section 21 in a relatively early state of formation. Depending on the geometry of the given container 2 that is to be blow molded, following the initial introduction of pressurized gas solely through the annular gap 56, the further introduction of pressurized gas can occur only through the discharge ports 55 of the stretch rod 11. However, it is also possible to supply the pressurized gas at least temporarily through both the annular gap 56 and the discharge ports 55.

Supplying pressurized gas simultaneously through the discharge ports 55 and the annular gap 56 makes it possible, due to the parallel connection of the flow paths, to supply pressurized gas with a lower flow resistance and thus in a smaller amount of time. Supplying pressurized gas in the second time phase of the blow-molding process solely through the discharge ports 55 promotes cooling in the area of the base of the container 2, which is formed significantly thicker than the sidewalls of the container for process-related reasons and therefore must be more intensely cooled to achieve sufficient material stability.

In principle, it is thus possible to supply the pressurized gas exclusively by the first flow path at first and then by the second flow path. However, it is also possible to supply the pressurized gas by both flow paths during the second phase of the blow-molding process or to provide an intermediate phase in which pressurized gas is first supplied simultaneously by both flow paths, and then a shaping phase in which pressurized gas is supplied exclusively by the second flow path.

In accordance with a preferred variant of the method, pressurized gas at a relatively low pressure level, for example, at a pressure of 5-20 bars, is supplied by the first flow path, while pressurized gas at a relatively high pressure level, for example, at a pressure of about 40 bars, is supplied by the second flow path. The lower pressure can be derived from the higher pressure by a pressure converter. In principle, it is also possible to design the cross-sectional shape of the first flow path in such a way that the first flow path is also connected to the higher pressure, and the flow resistance that is provided produces the intended pressure reduction.

As an alternative to the arrangement of the first flow path as an annular gap 56 surrounding the stretch rod 11, as shown in FIG. 9, it is also possible to provide the stretch rod 11 with a larger diameter and to arrange the separate flow paths inside the stretch rod 11. To this end, with the positioning above the mouth section 21 that is illustrated in FIG. 9, it would be advantageous to provide the stretch rod with discharge ports that open in the first flow path. However, the embodiment illustrated in FIG. 9 has the advantage that only a relatively small fraction of the cross-sectional area of the mouth section 21 is filled by the wall material of the stretch rod 11 and as a result the comparatively large remainder of the cross-sectional area is available for the two flow paths.

Alternatively or additionally to supplying pressurized gas at different pressure levels by the two flow paths, it is also possible to supply pressurized gas at different temperatures. In particular, it is proposed that pressurized gas be supplied at a higher temperature during a first process phase than during a second process phase.

A cooling effect during the second process phase can be promoted by a suitable configuration of the flow paths and the discharge ports 55. It has been found to be especially advantageous to select the geometric configuration of the flow paths in such a way that the highest possible pressure level is maintained in the rod interior 50 during the flow of the pressurized gas through the stretch rod, and that a large pressure gradient develops along the discharge ports 55. This results in expansion of the gas into the container locally and close to the base of the container 2, so that the cooling of the gas on expansion can be utilized in addition to the cooling of the container base.

Before the pressurized gas is discharged from the interior of the container 2, it is possible first to withdraw the stretch rod 11 completely from the interior of the blow mold 4 and thus to make the entire cross-sectional area of the mouth section 21 available for the gas being discharged. This promotes a rapid pressure drop, which results in cooling of the gas present inside the container 2 and thus in additional cooling of the wall material of the container 2.

Alternatively, however, it is also possible to leave the stretch rod in the position shown in FIG. 9 or in a slightly lowered position at least during part of the time interval necessary for the removal of the pressurized gas and to convey at least a portion of the pressurized gas back into the interior of the stretch rod 11 through the discharge ports 55. This produces a gas flow inside the container 2 during the removal of the pressurized gas. This gas flow is in the direction of the base of the container 2, so that an additional cooling effect is achieved. The optimum variant of the method is again selected on the basis of the specific geometry of the container 2.

Figure 10:
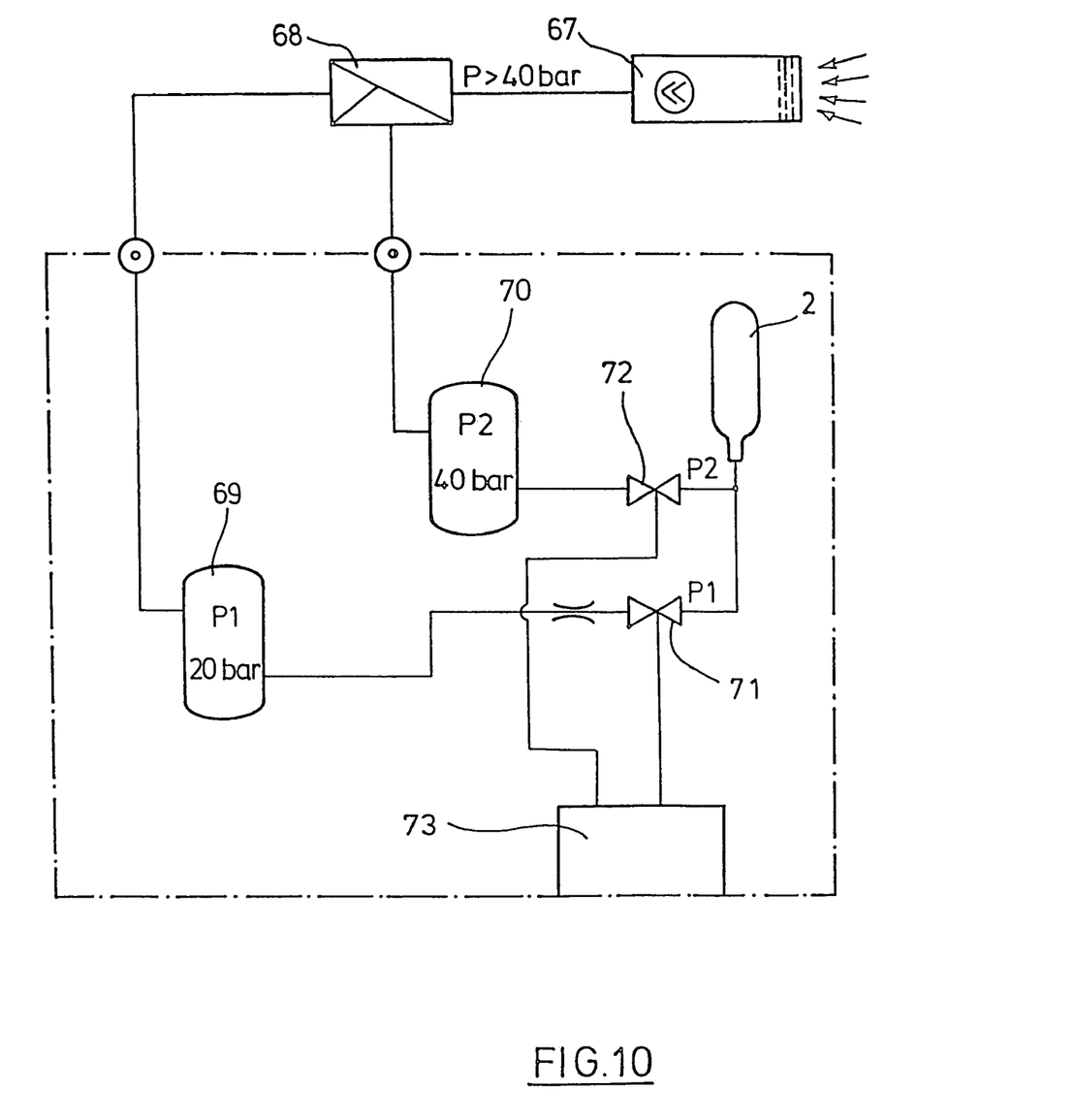
FIG. 10 shows a functional block diagram that illustrates the compressed air supply to the blowing station.

FIG. 10 shows a schematic functional block diagram of the compressed air supply. The container 2 that is drawn in the diagram simultaneously represents the preform 1 and the container bubble 23. Pressure at a delivery pressure level, for example, above 40 bars, is produced by a compressor 67. In the illustrated embodiment, a pressure reduction to two different supply pressure levels is effected by one or more pressure converters. The higher pressure level here is about 40 bars, and the lower pressure level is about 20 bars.

Reservoir volumes for each pressure are made available by tanks 69, 70, so that even in the case of timed delivery of pressurized gas, the given pressure level is at least approximately maintained. Valves 71, 72 are used for the controlled supply of pressurized gas. The valves 71, 72 are connected to a control unit 73, which coordinates the given switching times of the valves 71, 72.

In another embodiment, two separate flow paths are not used, but rather the course of the flow path can be varied. The course can be varied, for example, as a function of the acting pressure, or it can be varied mechanically. In this regard, the variations can be related both to a change in the orientation of the flow paths and to an opening or closing of discharge ports 35.

Figure 11:
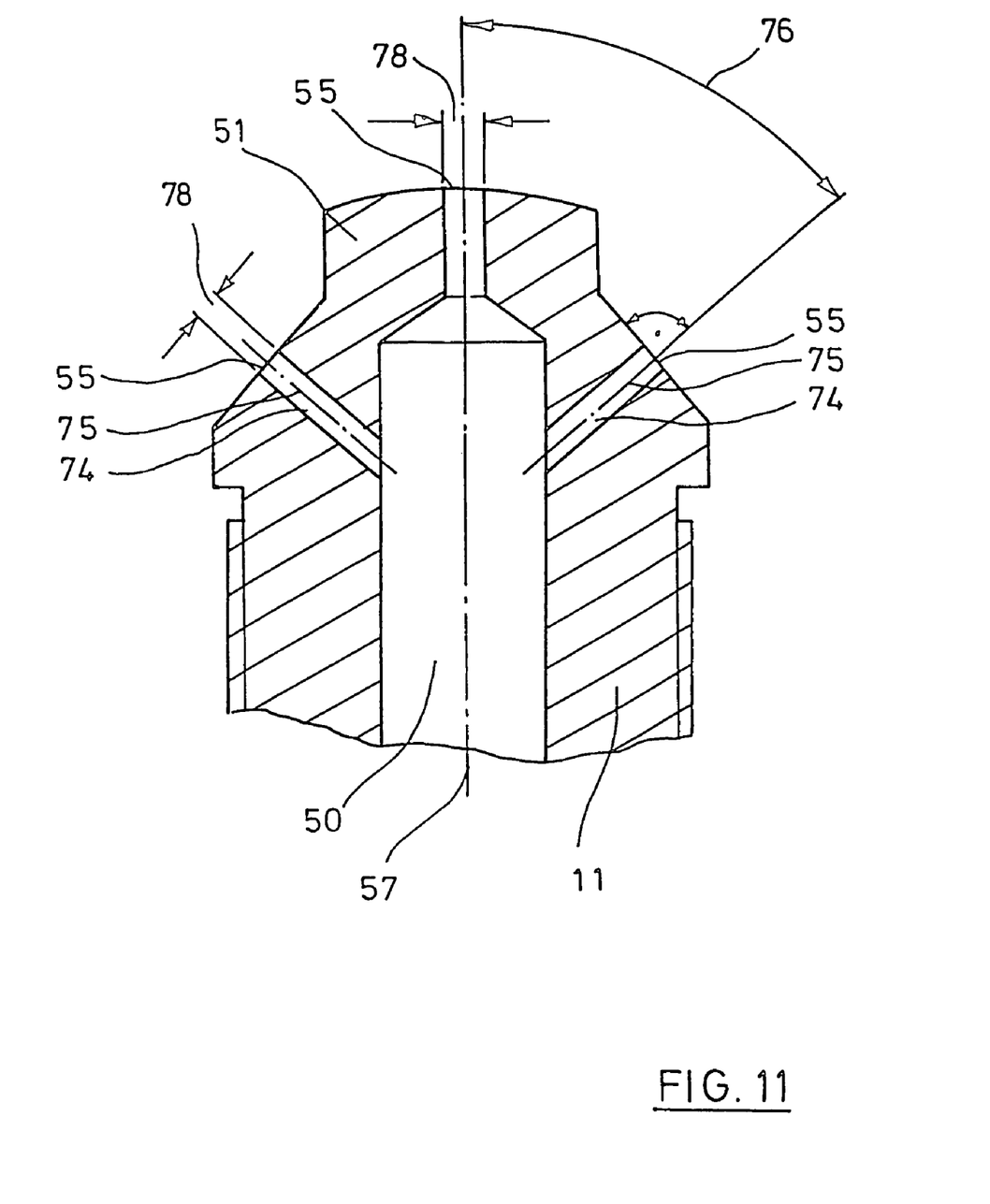
FIG. 11 shows a partial view of a stretch rod, which is provided with a plurality of discharge ports in the area of a stretch rod tip.

In one specific embodiment, it is possible to provide the stretch rod 11 with discharge ports 55 both some distance from the stretch rod tip 51 and in the vicinity of the stretch rod tip 51. During a first phase of the process, the discharge ports 55 in the vicinity of the stretch rod tip 51 are closed, and during a subsequent, second phase of the process, the discharge ports 55 located some distance from the stretch rod tip 51 are closed. This action can be controlled, for example, by displaceable elements, which are positioned as a function of the pressure or as a result of mechanical actuation.

After complete filling of the container 2 with the compressed air necessary for molding the container, the cooling effect basically ends, since no further gas is conveyed into the area of the container base. Taking this basic process sequence into consideration, an additional cooling effect can be achieved by using deliberately produced leakage. The leakage is preferably preset in such a way that pressurized gas is removed from the container 2 without an appreciable reduction of the pressure inside the container 2, and additional pressurized gas can flow back into the container 2 through the stretch rod 11. In this regard, the pressurized gas is preferably removed some distance from the base of the container. The leakage can be produced, for example, by timed, brief opening of the usual drain valve. It is also possible to use an additional leakage valve with a small flow cross section or to arrange a small-sized leakage opening or leakage gap.

FIG. 11 shows the arrangement of a plurality of discharge channels 74 in the vicinity of the stretch rod tip 51, which open into the interior 50 of the stretch rod 11. In particular, it is proposed that the discharge channels 74 be positioned as a ring of nozzles along the circumference of the stretch rod tip 51. Longitudinal axes 75 of the discharge channels 74 have an angle of inclination 76 relative to the longitudinal axis 57 of the stretch rod 11. The angle of inclination 76 is preferably 20-80°. In the embodiment illustrated in FIG. 11, an additional discharge channel 77 extends in the direction of the longitudinal axis 57 of the stretch rod. The diameters 78 of the discharge channels 74, 77 are typically 1-6 mm. In the illustrated embodiment, the stretch rod tip 51 can be screwed into a tubular base member of the stretch rod 11.

Figure 12:
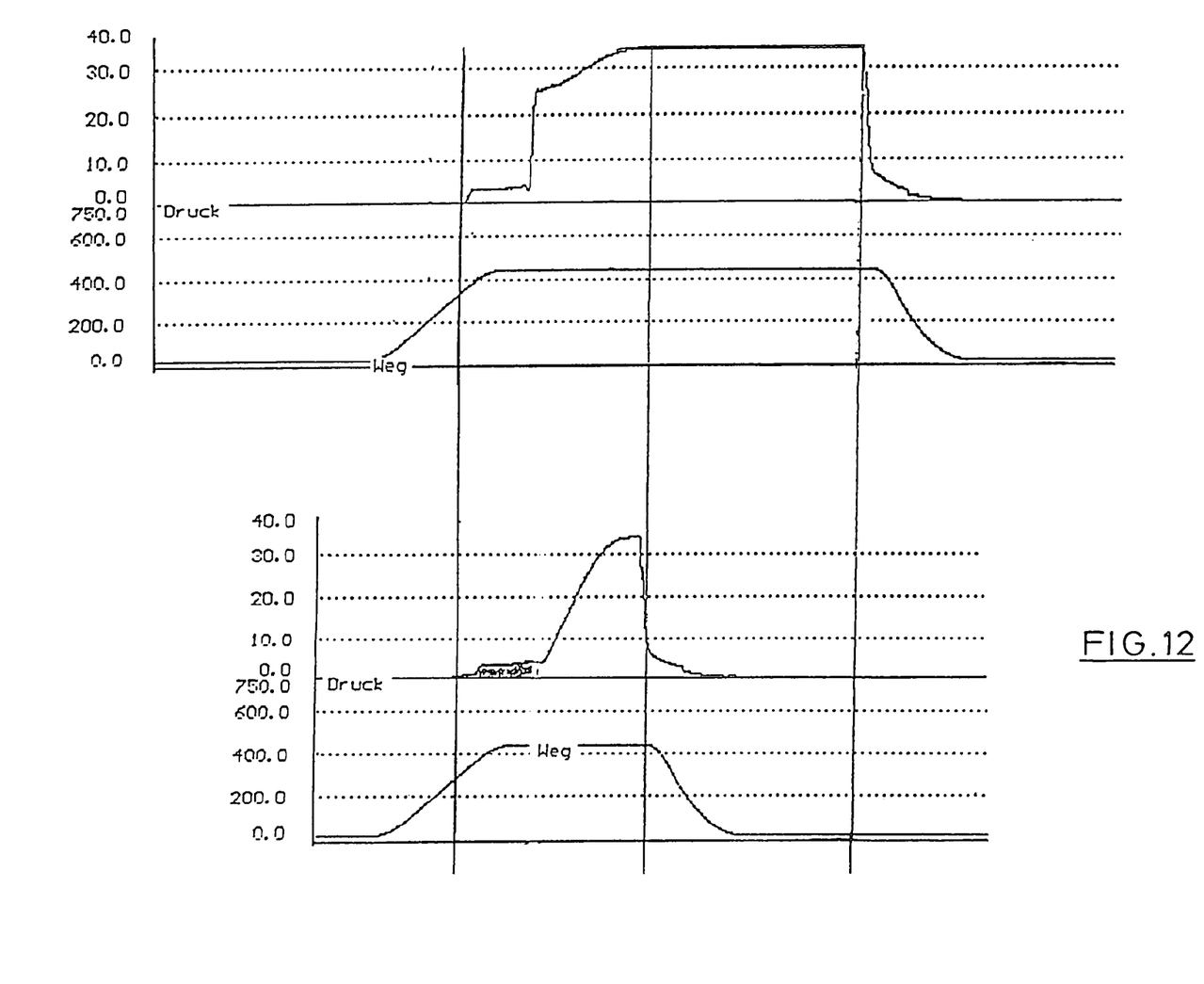
FIG. 12 shows graphs comparing a conventional blowing pressure curve and a blowing pressure curve obtained when additional cooling of the base area is provided by the blowing air flowing into the container.

FIG. 12 illustrates the significant reduction of the process time that can be achieved by the cooling of the base area. In the conventional process curve shown in the upper graph of FIG. 12, the preblowing phase with a first blowing pressure is about 0.3-0.4 second, the main blowing phase with a pressure of 30-40 bars is about 1.5 seconds, and an additional 0.5 second is needed for the blowing pressure reduction and the removal of the blow-molded container 2 from the blow mold. The total process time is thus about 2.5 seconds. In the blowing pressure curve shown in the lower graph of FIG. 12, while the times for the preblowing phase and the postblowing phase remain essentially the same, there is a significant reduction of the time for the introduction of the high blowing pressure to about 0.5 second, so that the total process time is about 1.3 seconds. Accordingly, the required process time can be reduced almost by half.

Alternatively to the illustrated supply of a first, relatively low blowing pressure and a second, relatively high blowing pressure, it is also possible to supply only one uniform blowing pressure and to influence the resulting pressure buildup inside the container by the dimensioning of the flow paths. In a mode of operation of this type, especially the flow paths that can be varied with respect to time are advantageous for achieving process optimization.

The invention claimed is:

1. Method for blow molding containers, the method comprising stretching a preform inside a blow mold by a stretch rod after thermal conditioning and reshaping the preform into the container by the action of blowing pressure, and feeding pressurized gas into the container through the stretch rod, further comprising conveying at least a portion of the pressurized gas towards the base area of the container (2), and conveying the pressurized gas at least temporarily towards the base area at an internal pressure in the container (2) of at least 10 bars.

2. Method in accordance with claim 1, comprising supplying the pressurized gas at least temporarily by two different flow paths.

3. Method in accordance with claim 1, comprising conveying the pressurized gas through the stretch rod (11).

4. Method in accordance with claim 1, comprising relieving the pressure at least partially through the stretch rod (11).

5. Method in accordance with claim 1, comprising conveying the pressurized gas towards the base area at an internal pressure in the container (2) of at least 20 bars.

6. Method in accordance with claim 1, comprising conveying the pressurized gas towards the base area no more than 1 second after the start of the blowing operation.

7. Method in accordance with claim 1, comprising conveying the pressurized gas towards the base area no more than 0.5 second after the start of the blowing operation.

8. Method in accordance with claim 1, comprising conveying the pressurized gas towards the base area no more than 0.25 second after the start of the blowing operation.

9. Method in accordance with claim 1, comprising conveying at least 50% of the amount of gas flowing into the container (2) towards the base area.

10. Method in accordance with claim 1, comprising conveying at least 80% of the amount of gas flowing into the container (2) towards the base area.

11. Method in accordance with claim 1, comprising causing the pressurized gas to flow towards the base area starting from an upper part of the stretch rod (11) that faces towards the base area.

12. Method in accordance with claim 11, comprising causing the pressurized gas to flow out of the stretch rod (11) no more than 2.5 centimeters from a stretch rod tip (51).

13. Method in accordance with claim 12, comprising causing the pressurized gas to flow out of the stretch rod (11) no more than 1.0 centimeters from a stretch rod tip (51).

14. Method in accordance with claim 1, comprising, no later than when a maximum pressure level within the container (2) has been reached, removing gas partially from the container (2) without a significant reduction of the pressure level.

15. Method in accordance with claim 1, wherein the direction of flow of the gas flowing into the container (2) is at least temporarily varied.

16. Method in accordance with claim 1, comprising introducing the pressurized gas into the container some distance from the base area during a first phase of the process.

17. Method in accordance with claim 1, comprising conveying the pressurized gas towards the base area only during a second phase of the process.

18. Method in accordance with claim 1, comprising removing the finished blow-molded container (2) from the blow mold no later than 1.5 seconds after insertion of the preform (1) into the blow mold.

19. Device for blow molding containers, the device comprising at least one blowing station with at least one blow mold and at least one stretch rod, and wherein the stretch rod is connected to a supply system for supplying pressurized gas, wherein the stretch rod (1) has at least one flow path for the pressurized gas that leads into the region of a stretch rod tip (51), and means for at least temporarily conveying the pressurized gas towards a base area at an internal pressure in the container of at least 10 bars.

20. Device in accordance with claim 19, wherein at least two flow paths run through the stretch rod.

21. Device in accordance with claim 19, wherein the flow path is configured for feeding pressurized gas for the container molding.

22. Device in accordance with claim 19, wherein at least two flow paths are configured for feeding pressurized gas with different pressure levels.

23. Device in accordance with claim 19, wherein the stretch rod (11) has an interior (50) that is enclosed by sidewalls, and that the interior (50) is connected to a pressurized gas supply by a plurality of recesses in the wall.

24. Device in accordance with claim 19, wherein at least one adjusting element for realizing a valve function is arranged in the area of each flow path.

25. Device in accordance with claim 19, wherein the region of the stretch rod tip (51), starting from one end of the stretch rod (11), has a longitudinal extent of a maximum of 2.5 centimeters.

26. Device in accordance with claim 19, wherein the region of the stretch rod tip (51), starting from one end of the stretch rod (11), has a longitudinal extension of a maximum of 1.0 centimeters.

27. Device in accordance with claim 19, wherein the blowing station (3) has a leakage valve for presetting a well-defined leakage flow from the container (2).

28. Device in accordance with claim 19, wherein the flow path that runs through the stretch rod (11) has a geometrically variable shape, at least in certain regions.

29. Device in accordance with claim 28, wherein a slope of at least part of the flow path is variable relative to a longitudinal axis (57) of the stretch rod (11).

30. Device in accordance with claim 28, wherein at least part of the flow path is designed to be at least partially closable.

31. Device in accordance with claim 19, wherein the flow path runs obliquely to the longitudinal axis (57) of the stretch rod (11) in the area of its discharge from the stretch rod (11).

32. Device in accordance with claim 31, wherein an angle of inclination (76) measured between the longitudinal axis (57) of the stretch rod (11) and a longitudinal axis (75) of the flow path in the direction towards the container base has a value of 20-80°.

33. Device in accordance with claim 19, wherein a plurality of nozzle-like discharge ports for the pressurized gas is arranged in the area of the stretch rod tip (51).

\* \* \* \* \*